United States Patent [19]

Tanaka

[11] Patent Number: 5,450,465
[45] Date of Patent: Sep. 12, 1995

[54] METHOD FOR ENCLOSING DENTAL X-RAY FILM PACK AND ENCLOSURE THEREFOR

[75] Inventor: Hiroyuki Tanaka, Yokohama, Japan

[73] Assignee: Nix Company Ltd., Tokyo, Japan

[21] Appl. No.: 220,668

[22] Filed: Mar. 31, 1994

[30] Foreign Application Priority Data

Apr. 6, 1993 [JP] Japan .................................. 5-113581
Apr. 16, 1993 [JP] Japan .................................. 5-124588

[51] Int. Cl.6 .......................................... G03B 42/02
[52] U.S. Cl. ..................................... 378/168; 378/167
[58] Field of Search ................................. 378/168–170

[56] References Cited

U.S. PATENT DOCUMENTS

3,304,423 2/1967 Medwedeff .
3,510,652 5/1970 Greene et al. .
4,913,288 4/1990 Lanaka .............................. 378/169

FOREIGN PATENT DOCUMENTS

331044 8/1958 Switzerland .

*Primary Examiner*—Craig E. Church
*Attorney, Agent, or Firm*—Evenson, McKeown, Edwards & Lenahan

[57] ABSTRACT

An enclosure useful in enclosing a dental X-ray film pack upon taking an X-ray picture of a tooth is formed of an enclosing portion and a holding portion extending from the enclosing portion. To permit enclosure of a dental X-ray film pack provided with a bite block, the enclosing portion is formed of two separate sheets. After inserting the bite block into a basal part of the holding portion, the pack is covered between the two sheets and the two sheets are then fusion-bonded to seal the pack within the enclosing portion. The holding portion has a length sufficient to extend out of an oral cavity when the enclosing portion is inserted in the oral cavity. After taking the X-ray picture of the tooth, the dentist holds the enclosure at the holding portion, takes the enclosing portion out of the cavity, and then tears off the enclosure from a side of the holding portion, so that the dental X-ray film pack falls out of the enclosure. The dentist is therefore free from the potential danger that the patient's saliva may stick to him.

15 Claims, 13 Drawing Sheets

METHOD FOR ENCLOSING DENTAL X-RAY FILM PACK AND ENCLOSURE THEREFOR

BACKGROUND OF THE INVENTION a) Field of the Invention

This invention relates to a method for enclosing a dental X-ray film pack useful in X-ray photography of a tooth upon dental diagnosis or treatment and an enclosure therefor.

b) Description of the Related Art

To perform X-ray photography of a tooth, there is employed a dental X-ray film pack which comprises an X-ray-transmitting but light-tight packaging member and an X-ray film enclosed within the packaging member. Such a dental X-ray film pack will next be described with reference to drawings.

FIG. 1 is a plan view of the dental X-ray film pack. In the drawing, numeral 1 is a packaging member made of an opaque flexible sheet so that the packaging member transmits X-rays but shields light. Designated at numeral 2 is an X-ray film sealed within the packaging member 1.

Upon X-ray photography of a tooth of a patient, a dentist inserts the dental X-ray film pack into the oral cavity of the patient, holds the dental X-ray film pack in contact with the desired tooth and irradiates X-rays from an opposite side of the dental X-ray film pack. As a result, an X-ray latent image of the tooth is obtained on the X-ray film 2. The dentist takes the dental X-ray film pack out of the oral cavity of the patient, opens the packaging member 1 in a dark room or a dark box to take the X-ray film 2 out of the packaging member 1, and conducts development of the X-ray film 2. In this manner, an X-ray picture of the desired tooth can be obtained on the X-ray film 2. The dentist conducts a diagnosis or a treatment based on the X-ray picture.

When conducting X-ray photography, a dentist performs procedures including insertion of a dental X-ray film pack into the oral cavity of a patient, its removal from the oral cavity, and opening of the packaging member 1 to take the X-ray film 2 out for its development. It is therefore impossible to avoid sticking of the patient's saliva, which has been adhered a lot on the dental X-ray film pack, to the dentist.

Such sticking of saliva not only gives unpleasant feeling to the dentist but also has the potential danger that, when the dentist has a wound at a finger or the like, a virus in the saliva may penetrate through the wound and the dentist may be afflicted with a disease.

To prevent the above danger, the applicant has already proposed an envelope for enclosing a dental X-ray film pack (see U.S. Pat. No. 4,913,288 issued to the inventor of the present application on Apr. 3, 1990). This envelope will next be described with reference to some drawings. FIG. 2 is a front view of the envelope while FIG. 3 is a cross-sectional view of the envelope taken along line III—III of FIG. 2. Shown in these drawings are an enclosing portion 3 and X-ray-transmitting flexible sheets 3a,3b made of a synthetic resin and forming the enclosing portion 3. The sheets 3a,3b are fusion-bonded along left-hand and right-hand edges thereof, whereby the enclosing portion 3 is formed into a bag-like shape opening at both upper and lower edges thereof. Designated at numeral 4 indicates a holding portion. Symbols 4a,4b indicate sheets extending continuously from the sheets 3a,3b, respectively. These sheets 4a,4b are formed narrower but longer than the sheets 3a,3b. Numeral 5 indicates a flap portion which extends out slightly from the upper edge of the sheet 3b and is coated with an adhesive. At numeral 6, there is shown a pinching portion which is formed at a free end portion of the sheet 4b and extends outwardly beyond a free end of the sheet 4a.

Upon conducting X-ray photography, a dentist inserts a dental X-ray film pack into the enclosing portion 3 of the enclosure. The flap portion 5 is next folded and adhered onto the sheet 3a, so that an upper open end of the enclosing portion 3 is closed. As a consequence, the dental X-ray film pack enclosed within the enclosing portion 3 does not fall out of the enclosing portion 3. The dentist next places the enclosing portion 3 at a desired position relative to a tooth, which is to be photographed, within the oral cavity of a patient by a pair of tweezers. As an alternative, the enclosing portion 3 can be placed by the patient himself. In this state, the holding portion 4 sufficiently extends out of the oral cavity of the patient. Upon irradiation of X-rays from a side opposite to the enclosing portion 3, an X-ray latent image of the tooth is formed on the X-ray film 2.

Upon completion of the photography, the dentist holds the holding portion 4, takes the enclosing portion 3 out of the oral cavity of the patient and pulls apart the sheets 4a,4b of the holding portion 4 in opposite directions. As a result, the fusion-bonded side edges of the enclosing portion 3 are torn off so that the dental X-ray film pack enclosed within the enclosing portion 3 falls out of the enclosing portion 3. The dental X-ray film pack so fallen out is free of the patient's saliva because it has been enclosed within the enclosing portion 3 until that time. Therefore, there is no potential danger that the patient's saliva may stick to the dentist in the subsequent development processing.

Incidentally, the holding portion 4 can also be formed of a single sheet. Further, it is possible to use as each sheet a sheet having tearability in the direction of the length of the holding portion 4. Upon taking out the dental X-ray film pack, tearing of such a sheet permits easier removal of the dental X-ray film pack.

The dental X-ray film pack 1 shown in FIG. 1 is held at a photographing position upon taking an X-ray picture of a tooth. Although the patient may by himself hold the dental X-ray film pack 1 by his fingers as mentioned above, this holding is often achieved by using a block-shaped bitten support member (hereinafter called the "bite block") made of an X-ray transmitting material. This bite block is a discrete member from the dental X-ray film pack and upon photography, is used by adhering it on the dental X-ray film pack 1. This will be described with reference to FIGS. 4, 5 and 6.

FIGS. 4 and 5 are perspective views of dental X-ray film packs with bite blocks adhered thereon, respectively. In each of FIGS. 4 and 5, numeral 1 indicates the dental X-ray film pack shown in FIG. 1 and numeral 8 designates a bite block. In the example depicted in FIG. 4, the bite block 8 is adhered to a lower part of the dental X-ray film pack 1. In the example shown in FIG. 5, on the other hand, the bite block 8 is adhered to a central part of the dental X-ray film pack 1. FIG. 6 is a cross-sectional view of an oral cavity, showing how to use the dental X-ray film pack 1 shown in FIG. 4 and having the bite block adhered thereon. In FIG. 6, there are shown upper and lower teeth $T_1,T_2$, upper and lower gums $H_1,H_2$, and the oral cavity at letter M. By biting the bite block 8 between the teeth $T_1$ and $T_2$, the dental X-ray film pack 1 is surely held at a predetermined position.

In the above description, the bite block 8 was explained by way of example as such a bite block that is formed as a discrete member from the dental X-ray film pack 1 and is to be adhered upon photography. There are however dental X-ray film packs 1 with a bite block 8 already adhered thereon when purchased. Many of dental X-ray film packs 1 employed especially for the diagnosis of periodontal disease (i.e., alveolar pyorrhea) are provided with a bite block 8 and are called "bite wing dental X-ray film packs". In the case of bite wing dental X-ray film packs, their bitten support members are not in such a block shape as described above but are made of a thin synthetic resin material or paper sheet in many instances. Bitten support members made of a thin synthetic resin material or paper sheet will also be called "bite blocks" hereinafter, because they have the same function.

As has been described above, the dental x-ray film pack 1 with the bite block 8 already attached thereto or a bite wing dental X-ray film pack cannot be enclosed in any conventional enclosures. Even if one dares to enclose it, the bite block 8 cannot be bitten. The conventional enclosure cannot therefore be used.

SUMMARY OF THE INVENTION

An object of the present invention is to overcome the above-described problem of the conventional art and to provide a method for enclosing a dental X-ray film pack and an enclosure therefor, said method and enclosure permitting use of a bite block.

To achieve the above object, the present invention provides a method for enclosing a dental X-ray film pack having a bitten support portion attached to one side of the dental X-ray film pack to support the dental X-ray film pack by teeth within an oral cavity, which comprises:

providing an enclosure for the dental X-ray film pack, said enclosure having an enclosing portion formed of flexible sheets and adapted to enclose the dental X-ray film pack therein and a holding portion formed integrally and in continuation with the enclosing portion and having a length sufficient to extend out of the oral cavity when the enclosing portion is inserted in the oral cavity; and enclosing the dental X-ray film pack within the enclosing portion with the bitten support portion inserted in a part of the holding portion, said part continuing from the enclosing portion; and sealing the enclosing portion.

In another aspect of the present invention, there is also provided an enclosure suitable for use in the above enclosing method, in which the enclosing portion and the holding portion are formed of two flexible sheets, the flexible sheets are fusion-bonded to each other along a side of the enclosing portion, on which side the holding portion is formed, and remaining sides of the enclosing portion are not fusion-bonded, the width of a part of the holding portion, through which part the holding portion is connected to the enclosing portion, is set at a dimension greater than the width of the bite support portion, and the dimension of each of the sides of the enclosing portion is set sufficiently greater than the dimension of a corresponding side of the dental X-ray film pack to be enclosed within the enclosing portion.

Preferably, the flexible sheets are dimensioned so that in the enclosing portion, the sides extending in continuation with the side, which is located in continuation with the holding portion, have the same length. The flexible sheets can also be dimensioned so that in the enclosing portion, the sides extending in continuation with the side, which is located in continuation with the holding portion, have different lengths.

The dental X-ray film pack can be enclosed within the above enclosure by separating the two sheets apart from each other in the holding portion, inserting the bitten support portion into the holding portion, holding the dental X-ray film pack between the two sheets with the bitten support portion inserted in the holding portion, and fusion-bonding the remaining sides in continuation with the side on which the holding portion is formed.

In a further aspect of the present invention, there is also provided an enclosure suitable for use in the above enclosing method, in which the sides of the enclosing portion, said sides being located on opposite ends of the enclosing portion as viewed in directions vertical to the direction of extension of the holding portion, are formed as openings, the width of a part of the holding portion, through which part the holding portion is connected to the enclosing portion, is set greater than the width of the bite support portion, the dimension between the sides located on the opposite ends and defining the openings, respectively, is set greater than the dimension of the dental X-ray film pack in the direction of bitten sides of the bitten support portion, and the dimension of each of the sides of the enclosing portion on the opposite ends is set greater than the dimension of the dental X-ray film pack in a direction vertical to the bitten sides.

The dental X-ray film pack can be enclosed within the above enclosure by inserting the dental X-ray film pack through one of the openings into the enclosing portion so that the bitten support portion is located on a side of the holding portion, inserting the bitten support portion into the holding portion, and fusion-bonding the openings.

In each enclosure described above, the flexible sheets can have a predetermined tearable direction which is substantially the same as the direction of extension of the holding portion. Further, the holding portion is provided with means for facilitating tearing along the direction of extension of the holding portion, such as cuts or perforations.

According to the present invention, the enclosing portion is fusion-bonded only at the side to which the holding portion is connected. Upon enclosing the dental X-ray film pack, the sheets of the enclosing portion are separated from each other along the fusion-bonded side to insert the bitten support portion, which is attached to the dental X-ray film pack, into a basal part of the holding portion and the remaining sides of the enclosing portion are fusion-bonded and cut off with the dental X-ray film pack held between both the sheets. As an alternative, the dental X-ray film pack is enclosed into the enclosing portion through one of the openings of the enclosing portion and the bitten support portion of the dental X-ray film pack is inserted into a basal part of the holding portion. It is therefore possible to use the bitten support portion even the dental X-ray film pack has been enclosed within the enclosure.

DETAILED DESCRIPTION OF THE INVENTION AND PREFERRED EMBODIMENTS

Figure 7:
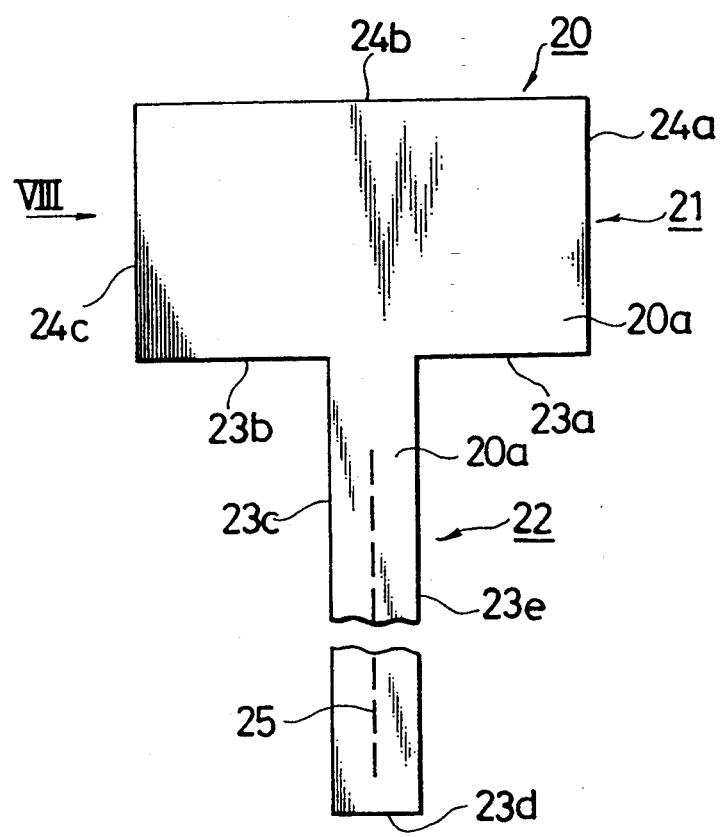
FIG. 7 is a plan view of an enclosure according to a first embodiment of the present invention, which is suited for use with a dental X-ray film pack.
Figure 8:
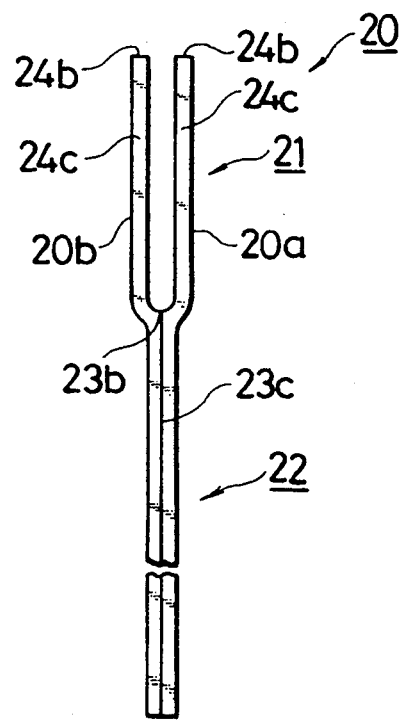
FIG. 8 is a cross-sectional view of the enclosure shown in FIG. 7, taken in the direction of arrows VIII—VIII of FIG. 7.

The enclosure according to the first embodiment of the present invention, which is suited for use with the dental X-ray film pack, will now be described with reference to FIGS. 7 and 8. In these drawings, the enclosure for the dental X-ray film pack 1 is illustrated at numeral 20. Also shown in these drawings are an enclosing portion 21 for enclosing the dental X-ray film pack 1 and a holding portion 22. Designated at symbols 20a,20b are a front sheet and a back sheet, respectively, which form the enclosing portion 21 and the holding portion 22. Flexible synthetic resin sheets are used for the sheets 20a,20b, and each of these sheets 20a, 20b has tearability in the direction of the length of the holding portion 22 (in the vertical direction in the individual drawings). Accordingly, each of the sheets 20a,20b can be easily torn off in the above-described direction but can be hardly torn off in directions other than the direction described above. Designated at numeral 25 are cuts formed in the holding portion 22 to facilitate tearing.

Figure 1:
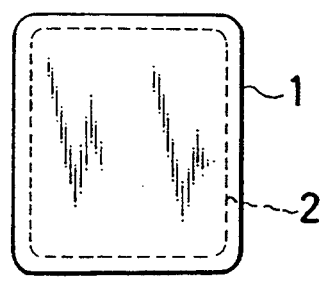
FIG. 1 is a plan view of a dental X-ray film pack.
Figure 2:
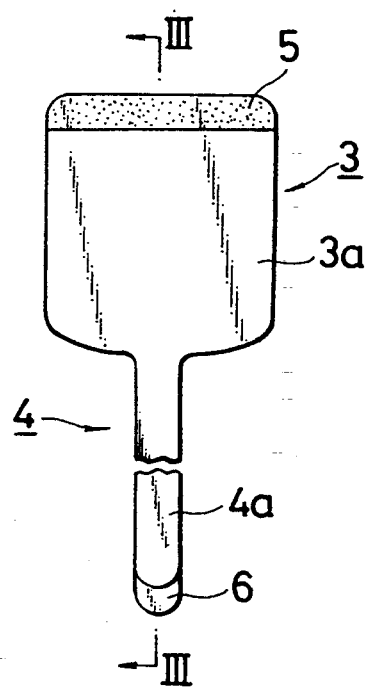
FIG. 2 is a plan view of a conventional enclosure for the dental X-ray film pack.
Figure 3:
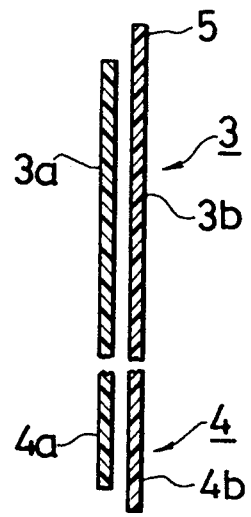
FIG. 3 is a cross-sectional view of the enclosure depicted in FIG. 2, taken in the direction of arrows III—III of FIG. 2.

Symbols 23a,23b indicate fusion-bonded portions at which sheets 20a,20b are fusion-bonded along a lower side of the enclosing portion 21, that is, the side from which the holding portion 22 is continuously formed, while symbols 23c,23d,23e designate fusion-bonded portions at which the sheets 20a,20b in the holding portion 22 are fusion-bonded to each other. Symbols 24a,24b,24c indicate sides of the respective sheets 20a,20b, said sides being not fusion-bonded (i.e., non-fusion-bonded portions). Namely, the enclosing portion 21 is not fusion-boded at portions other than the fusion-bonded portions 23a,23b. The dimensions of the enclosing portion 21 in the horizontal and vertical directions as viewed in FIG. 1 are set sufficiently longer than the lengths of the corresponding sides of the dental X-ray film pack 1 enclosed within the enclosing portion 21. Further, the width of the holding portion 22 is set longer than the width of bitten sides of the bite block 8, each of said bitten sides extending in the same direction as the corresponding side of the dental X-ray film pack 1.

Figure 4:
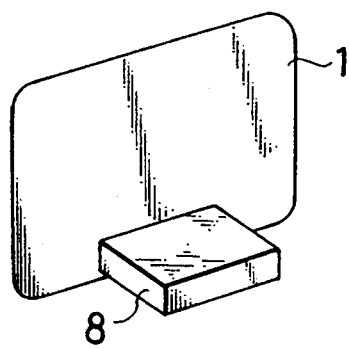
FIG. 4 is a perspective view of a dental X-ray film pack with a bite block attached thereon.
Figure 5:
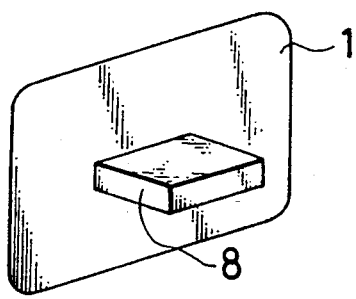
FIG. 5 is a perspective view of another dental X-ray film pack with a bite block attached thereon.
Figure 6:
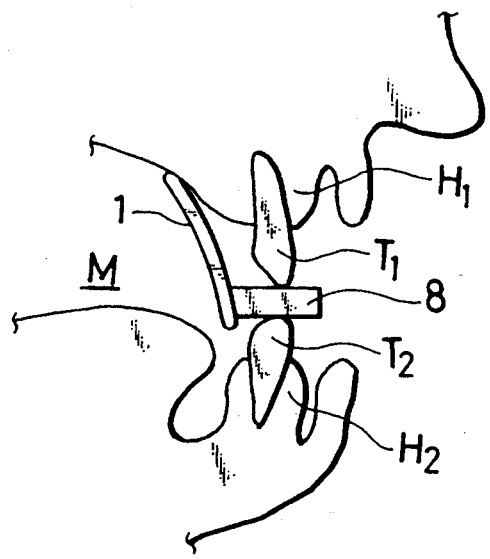
FIG. 6 is a cross-sectional view of an oral cavity.
Figure 9:
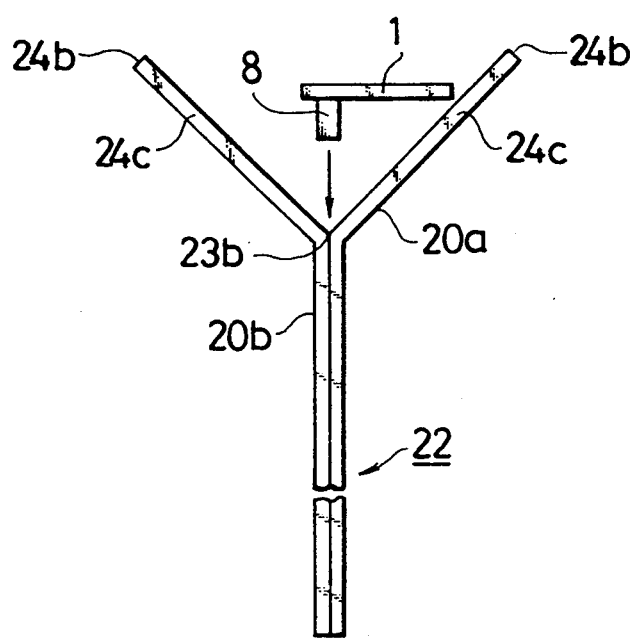
FIG. 9 is a side view illustrating a method for inserting the dental X-ray film pack into the enclosure shown in FIG. 7.
Figure 10:
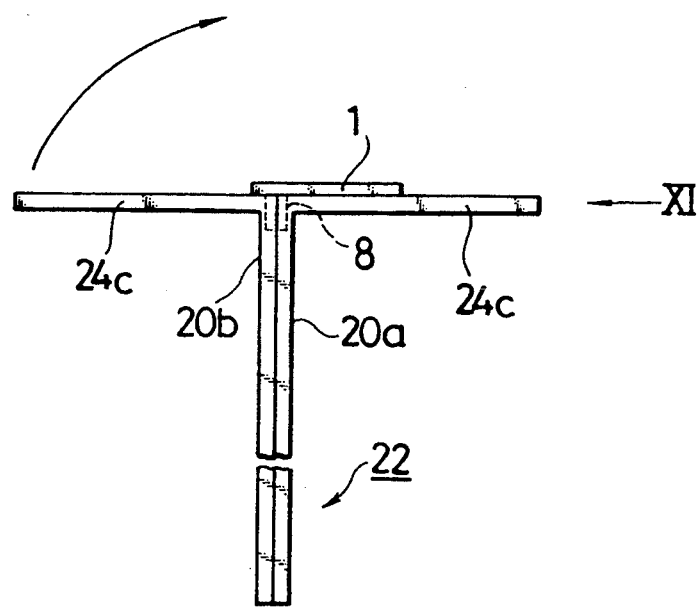
FIG. 10 is a side view also showing the method for inserting the dental X-ray film pack into the enclosure shown in FIG. 7.
Figure 11:
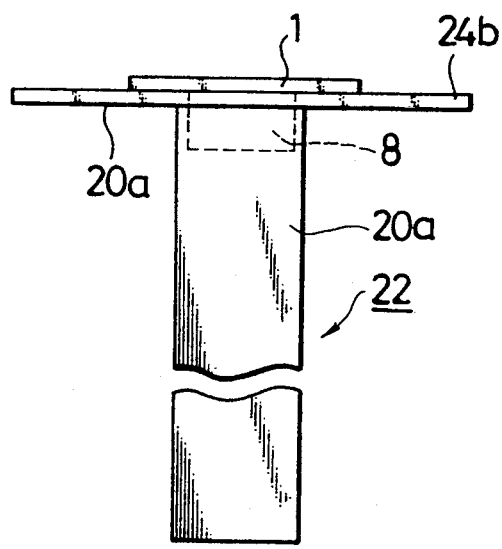
FIG. 11 is a side view in the direction of arrow XI of FIG. 10.

With reference to FIGS. 9 to 14, a description will next be made of the method for inserting the dental X-ray film pack 1 into the enclosure 20. In these drawings, elements of structure similar to the corresponding elements shown in FIGS. 7 and 8 are indicated by like reference numerals or symbols. First, as depicted in FIG. 9, the two sheets 20a,20b in the enclosing portion 21 are opened in opposite directions along the fusion-bonded portions 23a,23b. Next, the bite block 8 of the dental X-ray film pack 1, said bite block 8 being adhered in the manner shown in FIG. 4, is inserted into a basal part of the holding portion 22 as indicated by an arrow. The enclosure with the bite block so inserted is illustrated in FIGS. 10 and 11.

Figure 12:
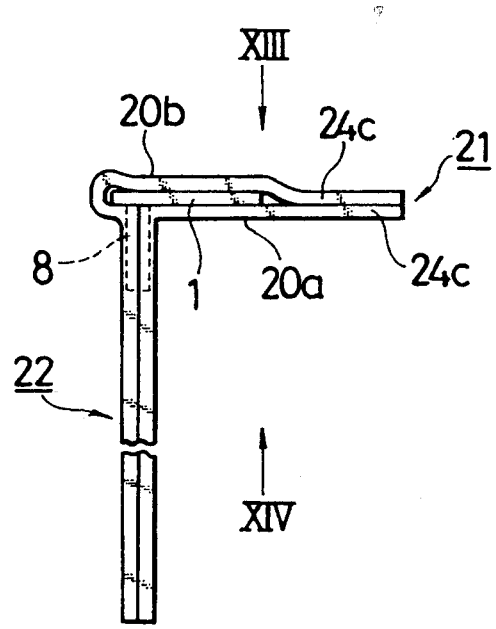
FIG. 12 is a side view depicting the method for inserting the dental X-ray film pack into the enclosure shown in FIG. 7.
Figure 13:
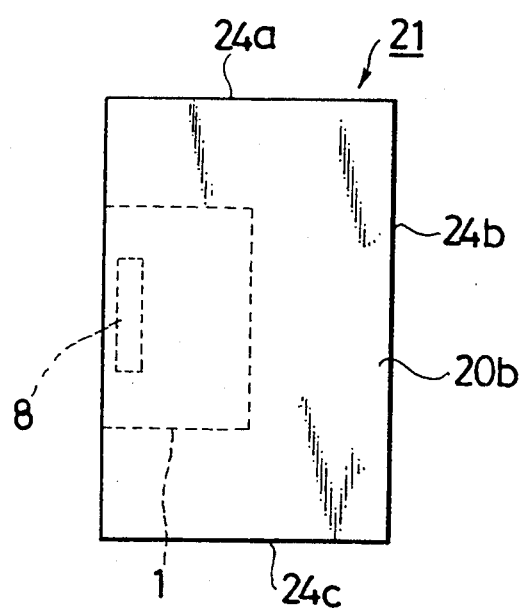
FIG. 13 is a side view in the direction of arrow XIII of FIG. 12.
Figure 14:
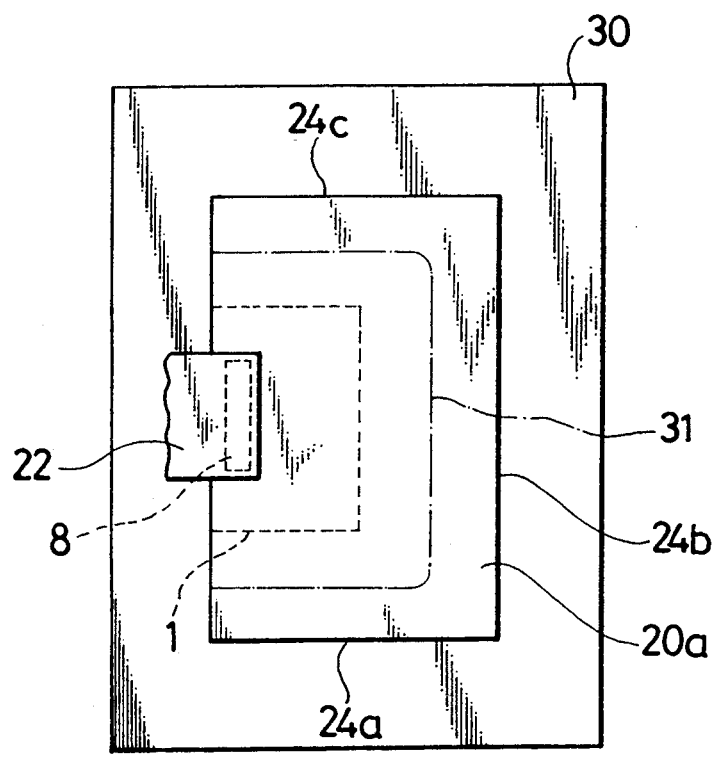
FIG. 14 is a side view in the direction of arrow XIV of FIG. 12.

Reference is next had to FIG. 12, in which the sheet 20b is folded along the lower side (i.e., the left-hand side in FIG. 12) of the dental X-ray film pack 1 to cover the dental X-ray film pack 1, in other words, to hold the dental X-ray film pack 1 between the sheet 20a and the sheet 20b. The enclosure with the bite block so held is illustrated in FIGS. 12 and 13. The enclosure 20 with the dental X-ray film pack 1 held as described above is turned upside down from the position shown in FIG. 12 (to the position in which the folded sheet 20b comes to the bottom) and is then mounted at a predetermined position on a fusion-bonding table 30 as shown in FIG. 14. In this position, the sheets 20a,20b are fusion-bonded and cut off along an alternate long and short dash line 31 by a known fusion-bonding machine (not illustrated). At this time, the holding portion 22 can be folded for its flexibility at a free end portion of the inserted bite block 8 and does not interfere with the fusion-bonding. By the procedures described above, the dental X-ray film pack 1 is enclosed and sealed within the enclosing portion 21 with the bite block 8 inserted in the basal part of the holding portion 22.

To allow the holding portion 22 to extend out of the oral cavity of a patient upon X-ray photography, the holding portion 22 is folded in the proximity of the free end portion of the bite block 8 inserted in the basal part. The enclosing portion 21 is then placed at a photographing position inside the oral cavity of the patient. The bite block 8 is bitten between teeth via the sheets of the holding portion 22 so that the dental X-ray film pack 1 is supported. X-rays are then irradiated. At this time, the holding portion 22 extends out of the oral cavity over a substantial length thereof. When X-ray photography is completed as described above, the dentist holds the holding portion 22 and takes the enclosing portion 21 out of the oral cavity of the patient. He then holds the respective sheets 20a,20b of the holding portion 22 at both sides of the cuts 25 and pulls them in opposite directions. The sheets 20a,20b are hence progressively torn off from the position of the cuts 25 owing to their tearability. As this tearing proceeds, the sheets 20a,20b in the enclosing portion 21 are also torn off so that the dental X-ray film pack 1 enclosed within the enclosing portion 21 externally falls out. The dental X-ray film pack 1 is thereafter processed in the same manner as in the conventional method.

According to the first embodiment, the enclosing portion 21 is fusion-bonded only at the side to which the holding portion 22 is connected, and the remaining sides are left in a state not fusion-bonded. To enclose the dental X-ray film pack 1, the sheets 20a,20b in the enclosing portion 21 are separated from each other along the fusion-bonded sides 23a,23b and the bite block 8 attached to the dental X-ray film pack 1 is then inserted into the basal part of the holding portion 22. One of the sheets is folded to hold the dental X-ray film pack 1 between the sheets and in this state, the remaining sides of the enclosing portion 21 are fusion-bonded. It is therefore possible to use the bite block 8 even when the dental X-ray film pack 1 has been enclosed within the enclosure 20.

Figure 15:
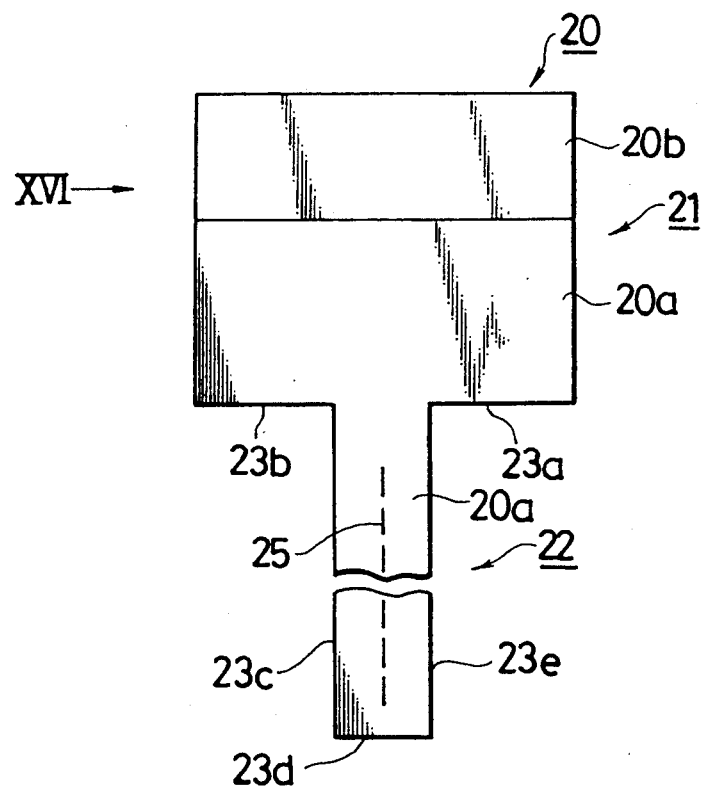
FIG. 15 is a plan view of an enclosure according to a second embodiment of the present invention, which is suited for use with a dental X-ray film pack.
Figure 16:
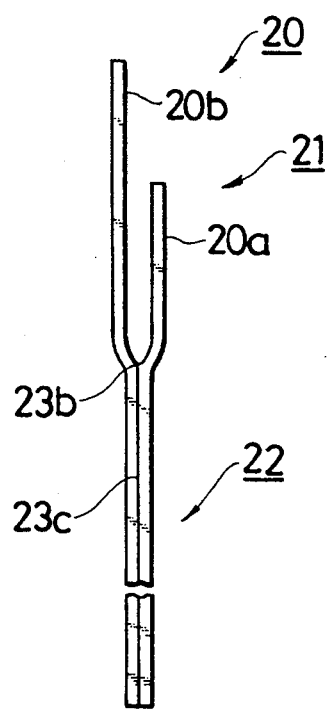
FIG. 16 is a side view of the enclosure shown in FIG. 15, viewed in the direction of arrow of XVI of FIG. 15.
Figure 17:
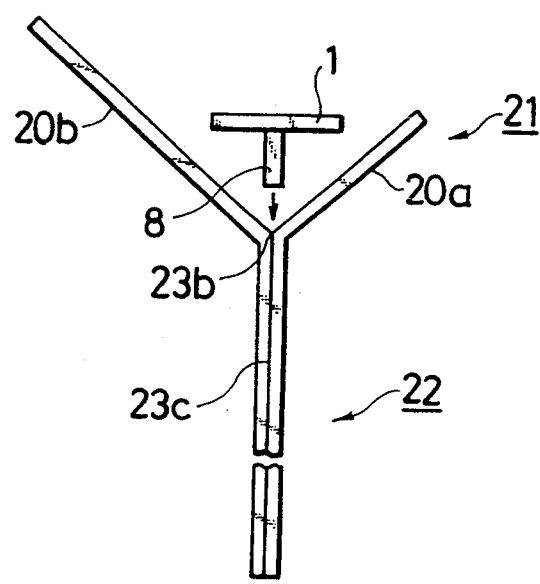
FIG. 17 is a side view illustrating a method for inserting the dental X-ray film pack into the enclosure depicted in FIG. 15.

The enclosure according to the second embodiment of the present invention will next be described with reference to FIGS. 15 to 18. This enclosure is suited for use with the dental X-ray film pack 1 which has the bite block 8 adhered to a central part of the dental X-ray film pack 1 as shown in FIG. 15. In FIGS. 15 to 18, elements of structure similar or equivalent to the corresponding elements shown in FIGS. 7 to 12 are indicated by like reference numerals or symbols.

The second embodiment is different from the first embodiment in that the dimension of the sheet 20b in the enclosing portion 21 as measured in the vertical direction (i.e., the direction of extension of the holding portion 22) is set longer than the corresponding dimension of the sheet 20a, but is the same as the first embodiment in the construction of the other elements and the method for enclosing the dental X-ray film pack 1.

Figure 18:
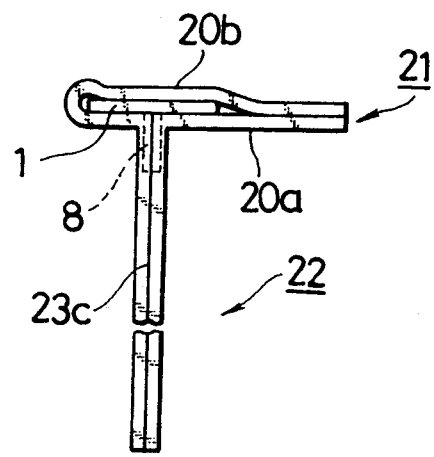
FIG. 18 is a side view also illustrating the method for inserting the dental X-ray film pack into the enclosure depicted in FIG. 15.

Their description is hence omitted herein. Eventually, the enclosure with the dental X-ray film pack 1 held between the sheet 20a and the sheet 20b as illustrated in FIG. 18 is mounted on a fusion-bonding table 30 similar to that employed for the first embodiment and the sheets 20a,20b are fusion-bonded and cut off by a fusion-bonding machine along the alternate long and short dash line 31 (see FIG. 14). The second embodiment has the same advantages as those of the first embodiment.

Needless to say, it is unnecessary to make the lengths of the individual sheets 20a,20b different in the enclosing portion 21 as in the second embodiment provided that the longitudinal dimensions of the sheets 20a,20b in the enclosing portion 21 are set substantially long.

Figure 19:
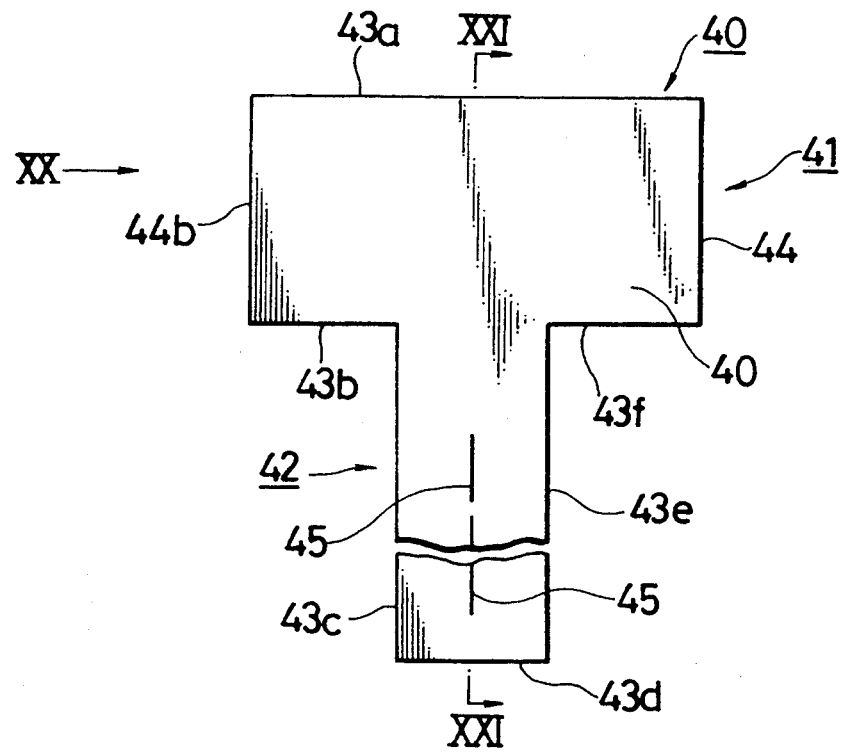
FIG. 19 is a plan view of an enclosure according to a third embodiment of the present invention, which is suited for use with a dental X-ray film pack.
Figure 20:
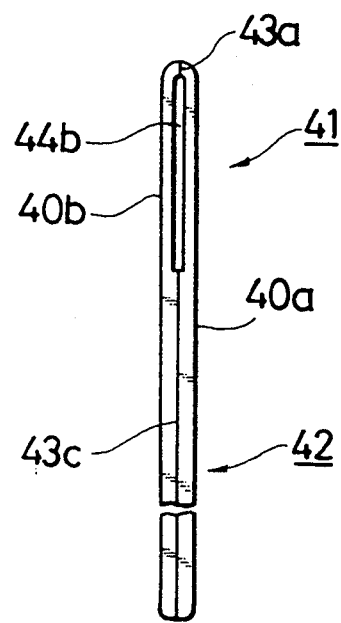
FIG. 20 is a side view of the enclosure shown in FIG. 19, viewed in the direction of arrow XX.
Figure 21:
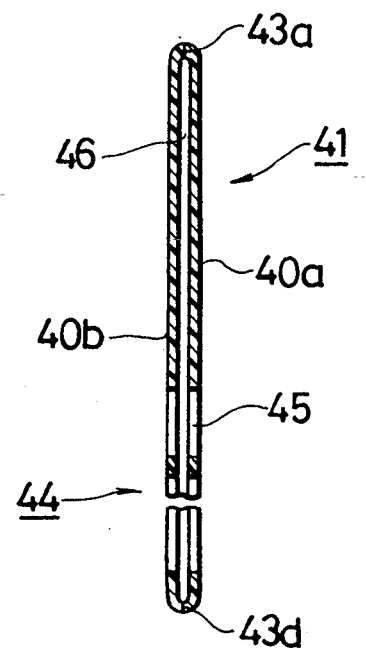
FIG. 21 is a cross-sectional view of the enclosure shown in FIG. 19, taken in the direction of arrows XXI—XXI.
Figure 22:
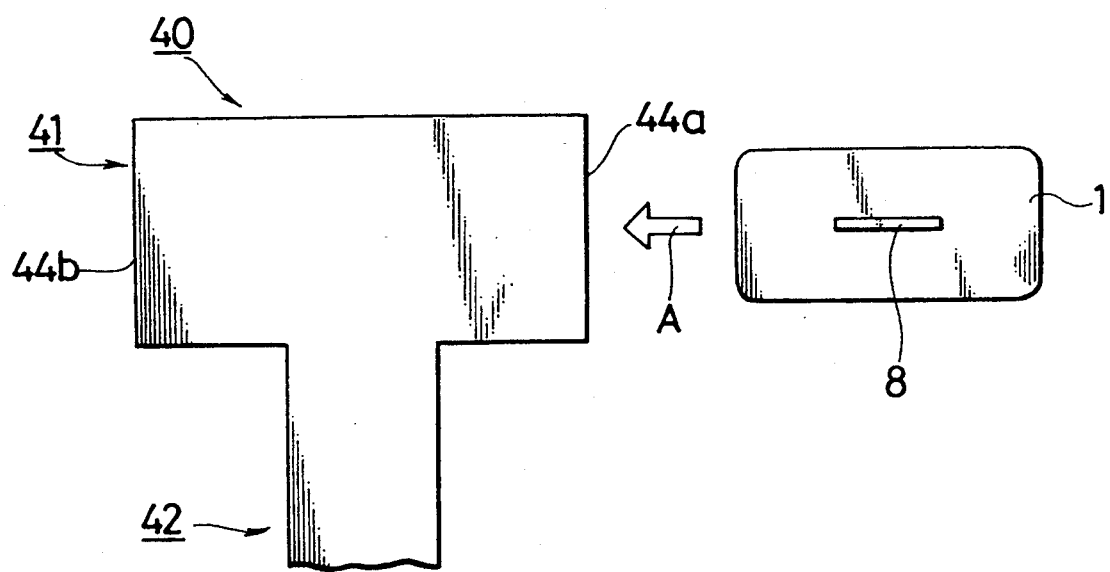
FIG. 22 is a plan view illustrating a method for inserting the dental X-ray film pack into the enclosure depicted in FIG. 19.

The enclosure according to the third embodiment of the present invention, which is suited for use with the dental X-ray film pack 1, will next be described with reference to FIGS. 19 to 21. In these drawings, there are shown an enclosure 40, an enclosing portion 41 for enclosing therein the dental X-ray film pack 1 (see FIG. 22), and a holding portion 42. Designated at symbols 40a,40b are a front sheet and a back sheet, respectively, which form the enclosing portion 41 and the holding portion 42. Flexible synthetic resin sheets are used for the sheets 40a,40b, and each of these sheets 40a, 40b has tearability in the direction of the length of the holding portion 42 (in the vertical direction in the individual drawings). Accordingly, each of the sheets 40a,40b can be easily torn off in the above-described direction but can be hardly torn off in directions other than the direction described above. Designated at numeral 45 are cuts formed in the holding portion 42 to facilitate tearing.

Symbols 43a,43b,43f indicate fusion-bonded portions at which the sheets 40a,40b are fusion-bonded to each other in the enclosing portion 41. Designated at symbols 43c,43d,43e are fusion bonded portions at which the sheets 40a,40b are fusion-bonded to each other in the holding portion 42. Symbols 44a,44b indicate openings formed at sides of the enclosing portion 41, said sides being located on opposite ends of the enclosing portion 41 as viewed in directions vertical to the direction of the length of the holding portion 42 (i.e., in the horizontal direction in FIG. 19). These openings 44a,44b are automatically formed when the sheets 40a,40b are fusion-bonded together at the fusion-bonded portions 43a,43b,43f.

Figure 23:
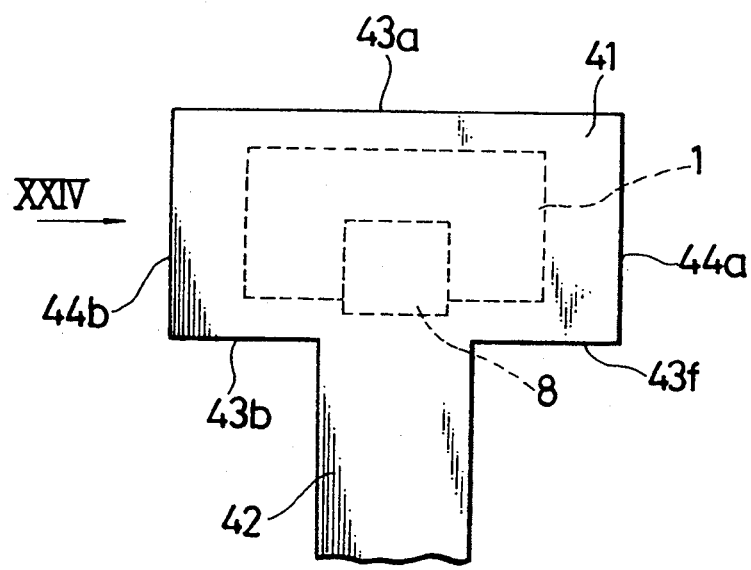
FIG. 23 is a plan view also illustrating the method for inserting the dental X-ray film pack into the enclosure depicted in FIG. 19.

The dimension between the opening 44a and the opening 44b in the enclosing portion 41 is set longer than the dimension of the dental X-ray film pack 1 as measured in the direction of the length thereof (i.e., in the horizontal direction in FIG. 23), whereas the dimension of each of the openings 44a,44b is set longer than the dimension of shorter sides of the dental X-ray film pack 1 (i.e., in the vertical direction in FIG. 23). Further, the width of the holding portion 42 is set longer than the width of the bite block 8 of the dental X-ray film pack 1.

Figure 24:
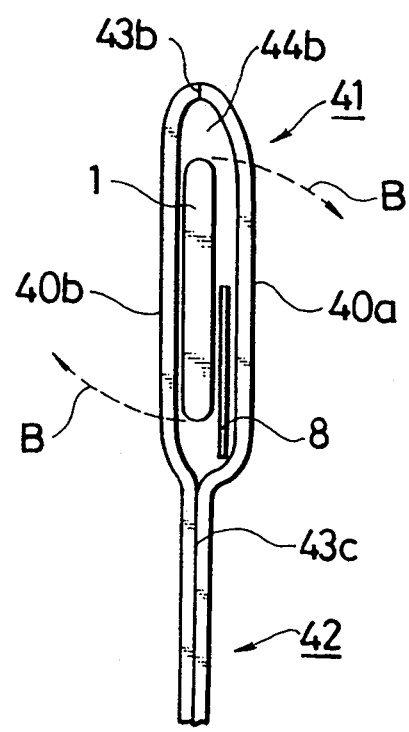
FIG. 24 is a side view of the enclosure shown in FIG. 23, viewed in the direction of arrow XXIV.

With reference to FIGS. 22 to 26, a description will next be made of the method for inserting the dental X-ray film pack 1 into the enclosure 40. First, the bite block 8 of the dental X-ray film pack 1, said bite block 8 being made of a thin synthetic resin or paper sheet, is folded on the dental X-ray film pack 1 so that the dental X-ray film pack 1 is in a planar form. In this form, the dental X-ray film pack 1 is inserted into the enclosing portion 41 through the opening 44a as illustrated by an arrow A in FIG. 22. The envelope with the dental X-ray film pack 1 inserted therein as described above is illustrated in FIGS. 23 to 24. Incidentally, FIG. 24 illustrates the elements on an enlarged scale in both widthwise and longitudinal directions.

Figure 25:
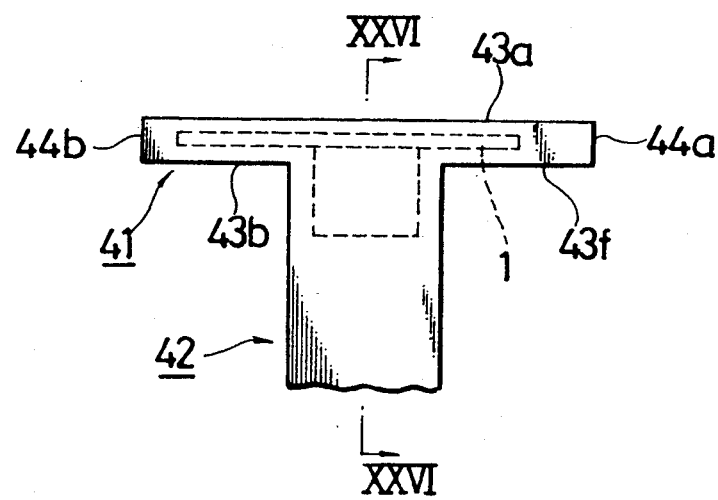
FIG. 25 is a plan view also illustrating the method for inserting the dental X-ray film pack into the enclosure depicted in FIG. 19.
Figure 26:
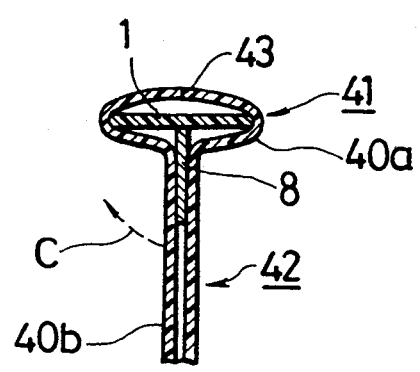
FIG. 26 is a cross-sectional view taken in the direction of arrows XXVI—XXVI of FIG. 25.

In this state, the dental X-ray film pack 1 is caused to turn within a space of the enclosing portion 41 in the direction of an arrow B indicated by a broken curve in FIG. 24, in other words, in such a direction that the bite block 8 will be positioned on a side of the holding portion 42. This turning is effected while opening by the dental X-ray film pack 1 the enclosing portion 41 in the direction of the thickness of the enclosing portion 41 (i.e., in the direction vertical to the drawing sheet of FIG. 23). This opening can be performed without any appreciable resistance owing to the flexibility of the sheets 40a,40b. When the above turning has been continued and the dental X-ray film pack 1 has been brought into a vertical position (into the direction vertical to the drawing sheet of FIG. 23), the turning is stopped and in this position, the bite block 8 located at a basal part of the holding portion 42 is inserted into the holding portion 42. The envelope with the bite block 8 inserted therein is illustrated in FIGS. 25 and 26. In this state, the openings 44a,44b are fusion-bonded by an unillustrated appropriate fusion-bonding machine so that the dental X-ray film pack 1 is sealed within the enclosing portion 41.

When it is desired to take an X-ray picture of a tooth on a side of one of the cheeks of a patient, the holding portion 42 is folded in the proximity of the free end portion of the bite block 8, which is inserted in the basal part, in the direction of an arrow C indicated by a broken curve in FIG. 26 and is then folded back. The enclosing portion 41 is then placed at a photographing position within the oral cavity of the patient and the bite block 8 is bitten between teeth via the sheets of the holding portion 42 to support the dental X-ray film pack 1. X-rays are then irradiated. At this time, the holding portion 42 extends out of the oral cavity over a substantial length thereof. When X-ray photography is completed as described above, the dentist holds the holding portion 42 and takes the enclosing portion 41 out of the oral cavity of the patient. He then holds the respective sheets 40a,40b of the holding portion 42 at both sides of cuts 45 and pulls them in opposite directions. The sheets 40a,40b are hence progressively torn off from the position of the cuts 45 owing to their tearability. As this tearing proceeds, the sheets 40a,40b in the enclosing portion 41 are also torn off so that the dental X-ray film pack 1 enclosed within the enclosing portion 41 externally falls out. The dental X-ray film pack 1 is thereafter processed in the same manner as in the conventional method.

According to the third embodiment, the openings 44a,44b are formed in the enclosing portion 41, the dental X-ray film pack 1 is inserted through the opening 44a, the dental X-ray film pack 1 is caused to turn in the space of the enclosing portion 41, and the bite block 8 is inserted in the basal part of the holding portion 42, as has been described above. It is therefore possible to use the bite block 8 even the dental X-ray film pack 1 has been enclosed within the enclosure 40.

In the above description of the third embodiment, the dental X-ray film pack was caused to turn in the space of the enclosing portion. Insertion of the dental X-ray film pack is however not limited to the above-described manner. It is possible first to deform the enclosing portion vertically (in the direction vertical to the drawing sheet of FIG. 25) and then to insert the dental X-ray film pack while holding it n a position vertical to the drawing sheet of FIG. 25.

In each of the first to third embodiments, it is not absolutely necessary to use tearable sheets as the sheets. The dental. X-ray film pack can be taken out of the enclosing portion by pulling apart the sheets of the holding portion in opposite directions and tearing off the fusion-bonded portions. As the means for facilitating tearing of the holding portion, perforations can be formed instead of the cuts.

What is claimed is:

1. A method for enclosing a dental X-ray film pack having a bitten support portion attached to and extending outwardly from one side of said dental X-ray film pack to support said dental X-ray film pack by teeth within an oral cavity, which comprises:

providing an enclosure for the dental X-ray film pack, said enclosure having an enclosing portion formed of flexible sheets and adapted to enclose said dental X-ray film pack therein and a holding portion formed integrally and in continuation with said enclosing portion and having a length sufficient to extend out of the oral cavity when said enclosing portion is inserted in the oral cavity; and enclosing said dental X-ray film pack within said enclosing portion with said bitten support portion inserted in a part of said holding portion, said part continuing from said enclosing portion;

2. An enclosure suitable for enclosing a dental X-ray film pack having a bitten support portion attached to one side of said dental X-ray film pack to support said dental X-ray film pack by teeth within an oral cavity, which comprises:

an enclosing portion formed of flexible sheets and adapted to enclose said dental X-ray film pack therein and a holding portion formed integrally and in continuation with said enclosing portion and having a length sufficient to extend out of the oral cavity when said enclosing portion is inserted in the oral cavity, at least a part of said holding portion being adapted to receive said bitten support portion therein;

wherein said enclosing portion and said holding portion are formed of two flexible sheets, said flexible sheets are fusion-bonded to each other along a side of said enclosing portion, on which side said holding portion is formed, and remaining sides of said enclosing portion are not fusion-bonded, the width of a part of said holding portion, through which part said holding portion is connected to said enclosing portion, is set at a dimension greater than the width of said bite support portion, and the dimension of each of said sides of said enclosing portion is set sufficiently greater than the dimension of a corresponding side of said dental X-ray film pack to be enclosed within said enclosing portion.

3. An enclosure according to claim 2, wherein said flexible sheets have a predetermined tearable direction which is substantially the same as the direction of extension of said holding portion.

4. An enclosure according to claim 3, wherein said holding portion is provided with means for facilitating tearing along the direction of extension of said holding portion.

5. An enclosure according to claim 4, wherein said means is in the form of cuts.

6. A method for enclosing a dental X-ray film pack according to claim 1,
wherein said enclosing portion and said holding portion are formed of two flexible sheets, said flexible sheets are fusion-bonded to each other along a side of said enclosing portion, on which side said holding portion is formed, and remaining sides of said enclosing portion are not fusion-bonded, the width of a part of said holding portion, through which part said holding portion is connected to said enclosing portion, is set at a dimension greater than the width of said bite support portion, and the dimension of each of said sides of said enclosing portion is set sufficiently greater than the dimension of a corresponding side of said dental X-ray film pack to be enclosed within said enclosing portion;
said method further comprising:
separating said two sheets apart from each other in said enclosing portion;
inserting said bitten support portion in said holding portion;
holding said dental X-ray film pack between said two sheets with said bitten support portion inserted in said holding portion; and
fusion-bonding said remaining sides in continuation with said side on which said holding portion is formed.

7. An enclosure according to claim 2, wherein said flexible sheets are dimensioned so that in said enclosing portion, the sides extending in continuation with the side, which is located in continuation with said holding portion, have the same length.

8. A method for enclosing a dental X-ray film pack according to claim 6, wherein said flexible sheets are dimensioned so that in said enclosing portion, the sides extending in continuation with the side, which is located in continuation with said holding portion, have the same length.

9. An enclosure according to claim 2, wherein said flexible sheets are dimensioned so that in said enclosing portion, the sides extending in continuation with the side, which is located in continuation with said holding portion, have different lengths.

10. A method for enclosing a dental X-ray film pack according to claim 6, wherein said flexible sheets are dimensioned so that in said enclosing portion, the sides extending in continuation with the side, which is located in continuation with said holding portion, have different lengths.

11. An enclosure suitable for enclosing a dental X-ray film pack having a bitten support portion attached to one side of said dental X-ray film pack to support said dental X-ray film pack by teeth within an oral cavity, which comprises:
an enclosing portion formed of flexible sheets and adapted to enclose said dental X-ray film pack therein and a holding portion formed integrally and in continuation with said enclosing portion and having a length sufficient to extend out of the oral cavity when said enclosing portion is inserted in the oral cavity;
wherein the sides of said enclosing portion, said sides being located on opposite ends of said enclosing portion as viewed in directions perpendicular to the direction of extension of said holding portion, are formed as openings, the width of a part of said holding portion, through which part said holding portion is connected to said enclosing portion, is set greater than the width of said bite support portion, the dimension between said sides located on said opposite ends and defining said openings, respectively, is set greater than the dimension of said dental X-ray film pack in the direction of bitten sides of said bitten support portion, and the dimension of each of the sides of said enclosing portion on said opposite ends is set greater than the dimension of said dental X-ray film pack in a direction perpendicular to said bitten sides.

12. A method for enclosing a dental X-ray film pack according to claim 1,
wherein the sides of said enclosing portion, said sides being located on opposite ends of said enclosing portion as viewed in directions perpendicular to the direction of extension of said holding portion, are formed as openings, the width of a part of said holding portion, through which part said holding portion is connected to said enclosing portion, is set greater than the width of said bite support portion, the dimension between said sides located on said opposite ends and defining said openings, respectively, is set greater than the dimension of said dental X-ray film pack in the direction of bitten sides of said bitten support portion, and the dimension of each of the sides of said enclosing portion on said opposite ends is set greater than the dimension of said dental X-ray film pack in a direction perpendicular to said bitten sides;
said method further comprising:
inserting said dental X-ray film pack through one of said openings into said enclosing portion so that said bitten support portion is located on a side of said holding portion;
inserting said bitten support portion into said holding portion; and
fusion-bonding said openings.

13. An enclosure according to claim 11, wherein said flexible sheets have a predetermined tearable direction which is substantially the same as the direction of extension of said holding portion.

14. An enclosure according to claim 13, wherein said holding portion is provided with means for facilitating tearing along the direction of extension of said holding portion.

15. An enclosure according to claim 14, wherein said means is in the form of cuts.

* * * * *